Figure 1:
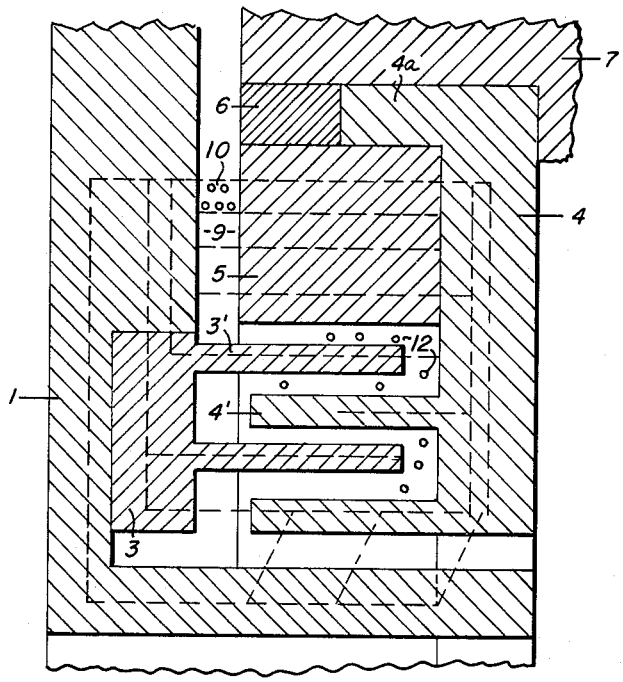

June 7, 1966

V. O. ISAKOV ETAL  3,254,745
SEAL TO PROTECT THE BEARINGS OF POWDER MAGNETIC
CLUTCHES OR OF SIMILAR DEVICES AGAINST
THE FERROMAGNETIC POWDER
Filed Jan. 21, 1963

United States Patent Office 3,254,745
Patented June 7, 1966

1

3,254,745
SEAL TO PROTECT THE BEARINGS OF POWDER MAGNETIC CLUTCHES OR OF SIMILAR DEVICES AGAINST THE FERROMAGNETIC POWDER
Vladimir Olimpijevich Isakov, Ulitsa Chaikovskovo, 28/35 Apt. 76, and Alexandr Fedorovich Loozkov, Ulitsa, Lenivka, 1/45, Apt. 51, both of Moscow, U.S.S.R.
Filed Jan. 21, 1963, Ser. No. 254,541
2 Claims. (Cl. 192—21.5)

This invention relates to magnetic clutches of the type utilizing finely divided magnetic material or powder, and more particularly to seals for use in such clutches for preventing the magnetic material or powder from entering the bearings of the driven member of the clutch.

It is well known that if a magnetic flux is effective in the zone of ferromagnetic powder leakage, the particles of ferromagnetic powder are retained and the more intensive the magnetic flux, the more reliable the protection will be for the bearings for the driven member against the action of the magnetic material or powder.

Seals are known which consist of an annular permanent Ferroxdur magnet having end-face or surface magnetizing, and non-magnetic labyrinths formed by annular comb-shaped parts but the efficiency of such seals is inadequate as these seals do not provide a closed circuit magnetic flux since the magnet is surrounded by nonmagnetic parts, and the parts defining the labyrinth are of nonmagnetic material.

Also known in the art is a seal wherein a closed-circuit magnetic flux is provided by the use of a set of permanent magnets arranged radially and located between two concentric steel rings. This type of seal is complex structurally and difficult to produce. In addition, the seal is bulky and does not provide a uniform magnetic flux.

An important object of the present invention is to provide a seal for magnetic clutches and similar structures of the type utilizing finely divided magnetic material or powder from which eliminates the above-mentioned drawbacks or objectionable characteristics.

Broadly, the invention comprises an annular permanent magnet having end face or surface magnetizing, a ring of nonmagnetic material surrounding the magnet, a component of ferromagnetic material cooperable with the end face will be for the magnet for providing the gap in which finely divided magnetic material operates, and labyrinth defining members of ferro-magnetic material operably associated with the magnet for preventing magnetic material from reaching the bearings of the driven member.

One object of the present invention is to obtain a more intensive, closed-circuit uniform magnetic flux in the zone of leakage of the finely divided material to ensure dependable protection of the bearings of the driven member against the penetration of the finely divided magnetic material.

A further object is to improve the operating conditions of the bearings of magnetic clutches and similar devices, thus increasing the dependability of operation.

A still further object is to prevent the finely divided magnetic material from escaping from the clutch recess, thus increasing the stability of working conditions of the clutch.

Figure 2:
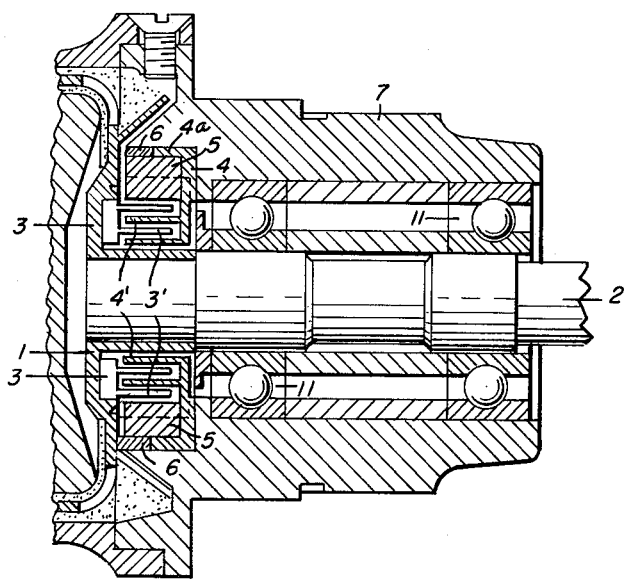

Further objects and advantages of the present invention will become more readily apparent to those skilled in the art from the following detailed description and annexed drawings, in which drawings:

FIG. 1 is a view in cross-section illustrating diagrammatically the magnetic flux of the annular magnet in the present seal, and FIG. 2 is a view partly in section and partly in elevation of the components constituting the seal.

As shown in FIG. 2, one end of driven shaft 2 of the magnetic clutch is mounted in a bushing 1 of ferromagnetic material and components 3 and 4 of ferromagnetic material which coact to define a cylindrical labyrinth which surrounds the bushing. The components 3 and 4 are cylindrical elements provided with inwardly directed spaced teeth 3' and 4' respectively, with the teeth of one element being located in the spaces of the other element.

An annular permanent magnet 5 having end face magnetizing surrounds the components defining the labyrinth and the magnet is mounted with one of its end faces being in contact with the element 4. The element 4 is provided with an inturned peripheral flange 4a which fits over the outer periphery of the magnet 5 for substantially one-half the height thereof as indicated in FIG. 1. The remainder of the periphery of the magnet is retained in a ring 6 of nonmagnetic material and the component 4 is mounted on a flange 7 also of nonmagnetic material.

A gap 9 in which finely divided magnetic material or powder 8 is retained is provided by the free end face of the magnet 5 and the bushing 1 which faces the magnet. The ring 6 and part of the flange 7 which surrounds the magnet 5 and which are, as above stated, of nonmagnetic material prevent shunting of the magnetic flux for by-passing the gap 9.

As shown in FIG. 1, a uniform intensive magnetic flux is produced in the gap 9, and under the action of such flux, the magnetic particles 8 are magnetized thereby forming a strong chain 10 that prevents the other powder particles from reaching the bearings 11, mounted in the flange 7 through the gap 9. Some of the particles indicated 12 which may have passed through the gap 9 are retained in the spaces between the teeth 3' and 4' defining the labyrinth under the action of the magnetic field.

A seal embodying the present invention is considerably more efficient and greatly improves the operation of the clutch as the magnetic material or powder is prevented from reaching the bearings of the driven member.

The invention is not to be confined to any strict conformity to the showings in the drawings but changes or modifications may be made therein so long as such changes or modifications mark no material departure from the spirit and scope of the appended claims.

What we claim is:

1. A magnetic clutch comprising a driven shaft, bearings for the shaft, a magnetic part carried by the shaft, an annular permanent magnet arranged in spaced coaxial relationship to the shaft and having opposite end faces, one of said end faces being spaced from the magnetic part to provide therebetween a gap, finely divided magnetic material located in the gap, and seal means for preventing the magnetic material from entering said shaft bearings, said seal means including an annular element located between the shaft and the annular magnet, inwardly directed spaced teeth on said annular element, an inwardly directed flange on the annular element extending over the outer periphery of the permanent magnet for approximately one-half of the height of the permanent magnet, a second annular element on the magnetic part, inwardly directed spaced teeth on said second annular element extending into the spaces between the teeth on said first annular element for providing a labyrinth between the gap and the bearings, and a ring of non-magnetic material surrounding the remainder of the height of said permanent magnet thereby preventing shunting of the magnetic flux for bypassing the gap with such flux magnetizing the particles in the gap and with any particles passing through the gap being retained in the spaces between the teeth due to the magnetic field prior to entry into the bearings.

2. The magnetic clutch as claimed in claim 1 in which said bearings and annular element are mounted in a flange means of non-magnetic material.

References Cited by the Examiner
UNITED STATES PATENTS

| | | | |
|---|---|---|---|
| 2,612,248 | 9/1952 | Feiertag | 192—84 |
| 2,874,982 | 2/1959 | Winther | 277—80 |
| 2,996,162 | 8/1961 | Lehde | 277—80 |

BERNARD A. GILHEANY, *Primary Examiner.*

JOHN F. BURNS, LARAMIE E. ASKIN, *Examiners.*

GEORGE HARRIS, JR., *Assistant Examiner.*